US012589635B2

(12) United States Patent
Bleker et al.

(10) Patent No.: US 12,589,635 B2
(45) Date of Patent: Mar. 31, 2026

(54) LEVER FOR AN AIR VENT ASSEMBLY

(71) Applicant: Faurecia India Private Limited, Maharashtra (IN)

(72) Inventors: Julien Bleker, Villiers le Bel (FR); Sachin Patil, Chikhali (IN)

(73) Assignee: FAURECIA INDIA PRIVATE LIMITED, Maharashtra (IN)

( * ) Notice: Subject to any disclaimer, the term of this patent is extended or adjusted under 35 U.S.C. 154(b) by 775 days.

(21) Appl. No.: 17/866,434

(22) Filed: Jul. 15, 2022

(65) Prior Publication Data
US 2023/0059229 A1 Feb. 23, 2023

(30) Foreign Application Priority Data
Jul. 15, 2021 (IN) .............................. 202121031899

(51) Int. Cl.
*B60H 1/34* (2006.01)

(52) U.S. Cl.
CPC ... *B60H 1/3421* (2013.01); *B60H 2001/3471* (2013.01)

(58) Field of Classification Search
CPC .............. B60H 1/3421; B60H 1/00857; B60H 1/3414; B60H 2001/3471; Y10T 74/20582

USPC .............................................. 454/155; 74/519
See application file for complete search history.

(56) References Cited

U.S. PATENT DOCUMENTS 4,876,563 A * 10/1989 Ishida ...................... G02B 7/08
396/494

FOREIGN PATENT DOCUMENTS

ES 2281304 A1 * 9/2007 .............. E05F 1/004

* cited by examiner

*Primary Examiner* — Steven B McAllister
*Assistant Examiner* — Charles R Brawner
(74) *Attorney, Agent, or Firm* — Reising Ethington P.C.

(57) ABSTRACT

A lever for an air vent assembly. The lever includes a first arm and a second arm, each extending from a base portion creating a guiding path therebetween. The first arm includes a first portion having a curved profile to facilitate abutment of the first portion with a movable disc of the assembly. The lever has a flexible third arm extending from the base portion and configured substantially parallel to the second arm. This shape and/or material of the third arm facilitates smooth and constant abutment of the first portion with the movable disc, and ensures a soft contact of the first lever against an inner surface of a housing of the assembly.

11 Claims, 7 Drawing Sheets

LEVER FOR AN AIR VENT ASSEMBLY

TECHNICAL FIELD

The present disclosure relates to the field of air vent systems for vehicle interior, and more particularly the present disclosure relates to a compact and efficient air vent assembly for a vehicle interior. Further, the present disclosure also relates to a simple, cost-effective, efficient lever with a flexible arm for smooth functioning of the air vent assembly.

BACKGROUND

Background description includes information that may be useful in understanding the present invention. It is not an admission that any of the information provided herein is prior art or relevant to the presently claimed invention, or that any publication specifically or implicitly referenced is prior art.

Air vent assembly is employed in vehicle interior for guiding, distributing, and controlling the inflow of air into vehicle interior from an HVAC system connected therewith. The assembly is provided with multiple vanes and/or flaps, being vertically or horizontally aligned, for controlling the air directivity and/or restricting the inflow of air into the vehicle interior as per the requirement of the occupants or users of the vehicle. The flaps act as shut-off flaps that are used to restrict or shut off the inflow of air into the vehicle interior. Further, the vanes are used for controlling the directivity of air into the vehicle interior.

Existing air vent assemblies involve a complex mechanism operably connected to the flaps and/or the vanes to affect and control the movement of the flaps, and/or the vanes for restricting the inflow of air, and controlling air directivity, respectively, into the vehicle interior. The mechanism is configured inside a housing that may be coupled to the vehicle interior, and the flaps and vanes extend out from the housing at an opening of the HVAC duct in the vehicle interior. The mechanism comprises different sets of gears, motors, drives, and a movable disc being movably configured with each other, and operatively connected to the vanes and the flaps using different sets of lever(s), thereby making the assembly complex, heavy, and requiring more space to accommodate these components.

The lever(s) are also accommodated inside the housing, which remains movably coupled to the mechanism. Further, the flaps and the vanes remain connected to different lever(s) and extend out of the housing such that movement of the corresponding lever(s), upon actuation by the mechanism, enables movement of the flaps and/or the vanes, thereby controlling the air directivity and/or restricting the inflow of air into the vehicle interior.

Lever(s) used in existing air vent assemblies are generally planar members in form of linkages that engage with pins (guiding pins) provided on the movable disc. The movable disc can be actuated by the mechanism, either manually or by the motors, which causes the disc to rotate, and allowing the pins to engage with slots or guiding paths provided in the respective linkage/lever, thereby enabling movement of the flaps to restrict the inflow of air in the vehicle interior, and/or enabling movement of the vanes to control the air directivity into the vehicle interior, as required.

In some existing air vent assemblies, the movable disc remains configured with the respective lever(s) for the flap, and the vane, such that actuation of the mechanism or the rotation of the movable disc in a first direction causes a lever corresponding to the vane to engage with the pin of the movable disc, which rotates the vane around its rotational axis in a second direction (opposite to the first direction) to change the direction of the airflow into the vehicle interior. Upon further rotation of the movable disc in the first direction, the pin of the movable disc disengages from the lever associated with the vane and engages with another lever corresponding to the flap, which rotates the flap around its rotational axis in the second direction to shut off or restrict the air inflow into the vehicle interior.

A major drawback associated with existing air vent assembly is the inability of the lever (connected to the flap) to remain in constant and smooth contact with the surface of the movable disc, especially during the end stroke of the movable disc where the lever has a minimum area of contact with the movable disc. Besides, variable dimension or profile of the surface of the movable disc, and an inner surface of the housing restricts the lever to remain in constant and smooth contact with the surface of the movable disc, thereby making the existing air vent assembly inefficient in controlling the smooth rotation of the flaps or restricting the inflow of air into the vehicle interior.

In addition, excess or uncontrolled rotation of the movable disc in the second direction may push the lever against the inner surface of the housing and may cause the movable disc to apply a force on the lever. This may cause rough stopping of the lever against the inner surface of the housing and may create an impact on or resistance against the movable disc as well, which may also lead to mechanical failures in the functionality of the air vent assembly.

Another drawback associated with existing air vent assemblies is the bulky structure and larger area of the levers being used inside the housing, which consumes more space inside the housing, making the overall mechanism and the air vent assembly complex, heavy and bulky. Further, such assemblies also require more material for manufacturing the lever, and a bigger housing for accommodating the components, thereby increasing the overall size and manufacturing cost of the assembly.

There is, therefore, a need to overcome the above drawback, imitations, and shortcomings, and provide a simple, cost-effective, efficient lever for airflow restricting flaps of an air vent assembly, which maintains constant and smooth contact with the movable disc of the air vent assembly despite the dimension variability of the movable disc and inner surface of the housing and also enables smooth stopping of the lever.

OBJECTS OF THE PRESENT DISCLOSURE

Some of the objects of the present disclosure, which at least one embodiment herein satisfies are as listed herein below.

It is an object of the present disclosure to provide a lever with a flexible arm for smooth functioning of an air vent assembly.

It is an object of the present disclosure to provide a lever for an air vent assembly, which maintains constant and smooth contact with a movable disc of the air vent assembly despite the dimension variability/tolerance of the movable disc and the lever due to the material and so on.

It is an object of the present disclosure to provide a lever for an air vent assembly, which is compact and requires less material and effort for manufacturing and facilitates proper functioning to the air vent assembly.

It is an object of the present disclosure to provide an air vent assembly for vehicle interior, which can control the individual movement of airflow restricting flaps, and air directivity controlling vanes with a single actuator.

It is an object of the present disclosure to provide an air vent assembly for vehicle interior, which is simple, compact, and robust in design, and can reduce the complexity in assembling the air vent.

It is an object of the present disclosure to provide an air vent assembly for vehicle interior having a lever with a flexible arm that maintains constant and smooth contact with a movable disc of the air vent assembly despite the dimension variability/tolerance of the movable disc and the lever due to the material and so on.

SUMMARY

The present disclosure relates to the field of air vent systems for vehicle interior, and more particularly the present disclosure relates to a compact and efficient air vent assembly for a vehicle interior. Further, the present disclosure also relates to a simple, cost-effective, efficient a lever with a flexible arm for smooth functioning of the air vent assembly.

An aspect of the present disclosure pertains to a first lever for an air vent assembly. The first lever may comprise a base portion that may connect with a flap such that upon rotation of the first lever about a rotational axis of the base portion may enable movement of the flap to restrict the inflow of air into the vehicle. The first lever may further comprise a first arm and a second arm, each extending from the base portion such that a guiding path is created between the first arm and the second arm.

In an aspect, the first arm may be adapted to abut with a movable disc of the air vent assembly. The first arm may have a first portion having a curved profile based on an outer curved surface of the movable disc to facilitate abutment of the first portion of the first lever with the movable disc. Further, the first arm may have a second longitudinal portion extending parallel to the second arm, which may connect the first portion to the base portion. The first portion may extend at a predefined acute angle ranging from 30-80 degree with respect to the second portion, depending on the distance between the movable disc center and a guiding pin of the movable disc explained hereafter in detail.

The guiding path may be created between the second arm and the second portion of the first arm, which may be adapted to engage the guiding pin of the movable disc of the air vent assembly such that upon actuation of the movable disc in a first direction (say clockwise direction), the guiding pin may engage with and moves within the guiding path of the first lever to rotate it in a second direction (say anticlockwise direction) opposite to the first direction, and which may correspondingly move the flap to at least partially restrict the inflow of air into an interior of the vehicle or to change the airflow directivity into the vehicle interior.

In an aspect, the first lever may comprise a flexible third arm extending from the base portion and may be configured substantially parallel to the second arm on one side of the second arm, opposite to the first arm, and having an angle of 0-10 degree with respect to the second arm. A first end of the third arm may be connected to the base portion, and a second end of the third arm may be a free end that allows the third arm to move with respect to the second arm upon application of a force on the third flexible arm. Further, the flexible third arm may also be made of an elastic material such as Polypropylene (PP) or Thermoplastic Elastomer (TPE), etc. or is of smaller cross-sectional thickness compare to the cross-sectional thickness of the first lever to facilitate the flexibility. This shape and/or material of the flexible third arm may provide a natural biasing force/effect or elastic force/effect to an entire length of the flexible third arm, which may facilitate smooth and constant abutment of the first portion of the first arm with an outer surface of the movable disc during movement of the first lever with respect to the movable disc.

In addition, the flexible third arm may also facilitate smooth stopping of the first lever or ensuring a soft contact of the first lever against the inner surface of a housing of the air vent assembly, when a force is applied on the first lever, also when the movable disc is actuation. Further, the energy stored in the flexible third arm while being pressed against the inner surface may push the other part of the first lever against the outer surface of the movable disc, ensuring smooth and constant abutment of the first portion against the movable disc, especially during end stroke of the movable disc or the first lever when the contact area is minimum or lose between the movable disc and first lever.

According to another aspect, the present disclosure pertains to an air vent assembly for a vehicle interior. The assembly may comprise flap(s) and/or vane(s) to at least partially restrict airflow into an interior of the vehicle or to change an airflow directivity into the vehicle interior. The assembly may comprise an actuation mechanism configured inside a housing that may be configured in the vehicle interior, and the flaps and vanes may extend out from the housing such that they are positioned at an HVAC duct of the vehicle interior.

The assembly may comprise a first lever having a first arm, and a second arm, each extending from a base portion to create a first guiding path between the first arm and the second arm. Further, the first lever may comprise a flexible third arm, made of a flexible material or of a reduced or smaller cross-sectional thickness compared to the cross-sectional thickness of the first lever to facilitate the flexibility and extending from the base portion, which may be configured substantially parallel to the second arm on one side of the second arm, opposite to the first arm. A first end of the third arm may be connected to the base portion, and a second end of the third arm may be a free end that allows the third arm to move with respect to the second arm upon application of a force on the third arm. Further, the assembly may comprise a second lever configured with a second guiding path.

The flaps may be connected to the first lever, and the vanes may be connected to the second lever. The assembly may comprise a movable disc configured with a guiding pin. The movable disc may be operatively coupled to an actuation mechanism such that upon actuation of the movable disc, the guiding pin engages with and move within the second guiding path of the second lever to rotate the vanes to change the direction of airflow into the vehicle interior. Upon further actuation of the movable disc, the guiding pin disengages with the second lever and engages with and move within the first guiding path of the first lever to rotate the flaps to at least partially restrict the inflow of air into the vehicle interior.

During rotation of the first lever, the construction and/or material of the flexible third arm of the first lever may provide a natural biasing effect or elastic effect to an entire length of the flexible third arm, which may facilitate smooth and constant abutment of the first portion of the first arm with an outer surface of the movable disc, and may also facilitate smooth stopping of the first lever or ensuring a soft contact of the first lever against the inner surface of a housing of the air vent assembly, when a force is applied on the first lever by the movable disc upon actuation of the movable disc, especially during end stroke of the movable disc or first lever when the contact area is minimum or lose between the movable disc and first lever.

Various objects, features, aspects and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
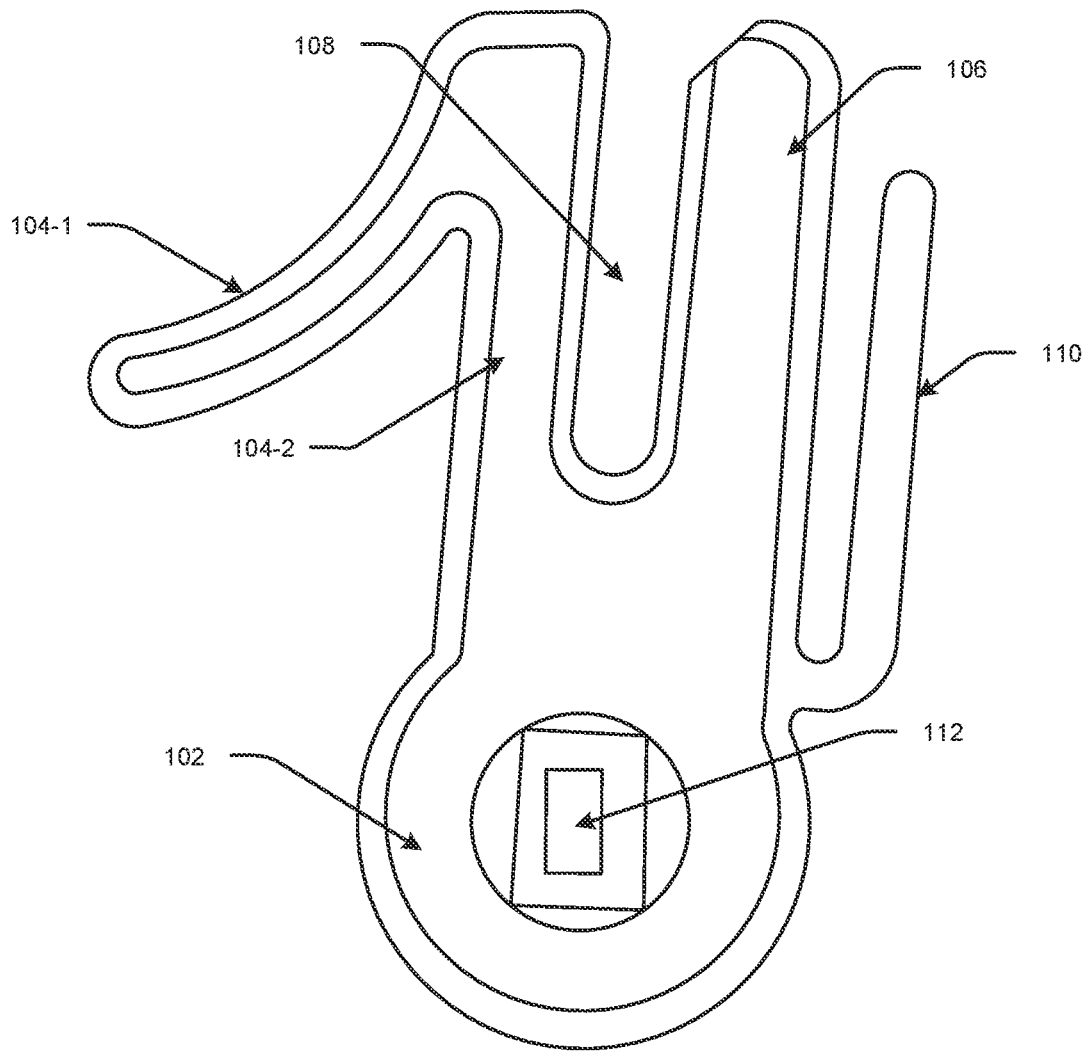
FIG. 1 illustrates an exemplary view of the proposed first lever, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some Embodiments of the present disclosure relate to a compact, and efficient air vent assembly for a vehicle interior. Further, the present disclosure also relates to a simple, cost-effective, efficient, and first lever for smooth functioning of the air vent assembly.

According to an aspect, the present disclosure elaborates upon a first lever for an air vent assembly of a vehicle. The first lever can include a first arm and a second arm, each extending from a base portion such that a guiding path is created between the first arm and the second arm. The guiding path can be adapted to engage a guiding pin of a movable disc of the air vent assembly. The first lever can further include a flexible third arm extending from the base portion and configured substantially parallel to the second arm. The flexible third arm can be adapted to provide a biasing effect and facilitate smooth and constant abutment of a first portion of the first arm with an outer surface of the movable disc.

In an embodiment, a first portion of the first lever can include a curved profile based on a profile of an outer curved surface of the movable disc to facilitate abutment of the first portion of the first lever with the movable disc.

In an embodiment, a second portion of the first arm can be a longitudinal member connecting the first portion of the first arm to the base portion.

In an embodiment, the first portion of the first arm can extend at a predefined acute angle ranging from 30-80 degrees from the second portion of the first arm, depending on the distance between the movable disc center and the guiding pin of the movable disc.

In an embodiment, the second portion of the first arm, and the second arm can extend parallel to each other to create the guiding path therebetween.

In an embodiment, one or more flaps of the air vent assembly can be coupled to the base portion. Further, the first lever, and the one or more flap can be rotatably coupled to the air vent assembly by the base portion.

In an embodiment, upon actuation of the movable disc in a first direction, the guiding pin can engage with and move within the guiding path of the first lever to rotate it in a second direction opposite to the first direction, and correspondingly move the one or more flap to at least partially restrict the inflow of air into an interior of the vehicle or to change the airflow directivity into the vehicle interior.

In an embodiment, the flexible third arm can be configured substantially parallel to the second arm and having an angle of 0-10 degrees with respect to the second arm, which can facilitate smooth stopping of the flexible third arm against an inner surface of a housing of the air vent assembly when a force is applied on the first lever by the movable disc upon actuation of the movable disc.

In an embodiment, the flexible third arm can have a smaller cross-sectional thickness compared to the cross-sectional thickness of the first lever (100) facilitating the flexibility or is made of a material selected from PP or TPE for facilitating the flexibility According to another aspect, the present disclosure elaborates upon an air vent assembly for a vehicle interior. The assembly can include a first lever connected to one or more flaps for at least partially restricting air flow into an interior of the vehicle. The first lever can include a first arm and a second arm, each extending from a base portion such that a guiding path is created between the first arm and the second arm. The guiding path can be adapted to engage a guiding pin of a movable disc of the air vent assembly. The first lever can further include a flexible third arm extending from the base portion and configured substantially parallel to the second arm. Particularly, the flexible third arm is extending at an angle of 0-10 degrees with respect to the second arm. Further, the assembly can include a movable disc configured with a guiding pin such that upon actuation of the movable disc in a first direction, the guiding pin can engage with and move within the guiding path of the first lever to rotate the first lever in a second direction opposite to the first direction, and can correspondingly move the flap to at least partially restrict the inflow of air into the interior of the vehicle or to change the air directivity of airflow into the vehicle interior. The flexible third arm can be adapted to facilitate smooth and constant abutment of a first portion of the first arm with an outer surface of the movable disc in all conditions that is also during rotation of the movable disc, and can also facilitate smooth stopping of the first lever against an inner surface of a housing of the air vent assembly when a force is applied on the first lever by the movable disc upon actuation of the movable disc in the second direction.

Referring to FIG. 1, in an aspect, the proposed first lever 100 can include a base portion 102 that can connect an airflow restricting flap of an air vent assembly (also referred to as assembly 200, herein) to it. The flap can be horizontally or longitudinally connected and locked with the base portion 102 using engaging means provided in the flap and the first lever 100, at a point 112 of the base portion 102 such that rotation of the first lever 100 about a rotational axis of the base portion 102 can enable movement of the flap. The first lever 100 can further include a first arm 104 and a second arm 106, each extending from the base portion 102 such that a guiding path 108 is created between the first arm 104 and the second arm 106.

In an embodiment, the first arm 104 of the lever 100 can have a first portion 104-1 having a curved profile based on an outer curved surface of a movable disc 208 of the assembly 200 (shown in FIG. 2) to facilitate abutment of the first portion 104-1 of the first lever 100 with the movable disc 208. Further, the first arm 104 can have a second longitudinal portion 104-2 extending parallel to the second arm 106, which can connect the first portion 104-1 to the base portion 102. In an exemplary embodiment, the first portion 104-1 can be oriented at a predefined angle from the longitudinal axis of the second portion 104-2 such that the first portion 104-1 and the second portion 104-2 make an acute angle therebetween, but not limited to the like.

In an embodiment, the guiding path 108 can be created between the second arm 106 and the second portion 104-2 of the first arm 104, which can be adapted to engage a guiding pin of the movable disc 208 of the assembly 200 such that upon actuation of the movable disc 208 in a first direction (say clockwise direction), the guiding pin can engage with and move within the guiding path 108 of the first lever 100 to rotate the lever 100 in a second direction (say anti-clockwise direction) opposite to the first direction, which can correspondingly move the flap to at least partially restrict the inflow of air into an interior of the vehicle.

In an embodiment, the first lever 100 can include a flexible third arm 110 extending from the base portion 102 and configured substantially parallel to the second arm 106 on one side of the second arm 106 (opposite to the first arm 104). A first end of the third arm 110 can be connected to the base portion 102, and a second end of the third arm 110 can be a free end providing a biasing effect that can allow the flexible third arm 110 to move with respect to the second arm 106 upon application of a force on the flexible third arm 110. Further, in another embodiment, the flexible third arm 110 can also be made of an elastic material. In yet another embodiment, the flexible third arm 110 can have a cross-sectional thickness less or smaller than compared to the cross-sectional thickness of the first lever 100.

In an embodiment, the free ends of the arms 104, 106 of the first lever 100 can have a predefined profile, which can facilitate the guiding pin to move within or move out of the guiding path 108 of the first lever 100.

It is to be appreciated by a person skilled in the art that this shape and/or material of the flexible third arm 110 can provide a natural biasing effect or elastic effect to an entire length of the flexible third arm 110, which can facilitate smooth and constant abutment of the first portion 104-1 of the first arm 104 with an outer surface of the movable disc 208 during movement of the first lever 100 with respect to the movable disc 208.

Besides, the flexible third arm 110 of the first lever 100 can also facilitate smooth stopping of the first lever 100 or ensuring a soft contact of the first lever 100 against the inner surface of a housing of the air vent assembly 200, when a force is applied on the first lever 100 by the movable disc 208 upon actuation of the movable disc 208 in the second direction. Further, the energy stored in the flexible third arm 110 while being pressed against the inner surface can push the other part of the first lever against the outer surface of the movable disc 208, ensuring smooth and constant abutment of the first portion 104-1 against the movable disc 208, especially during end stroke of the movable disc 208 or first lever 100 as shown in FIGS. 4C and 4D.

In addition, it is also to be appreciated by a person skilled in the art that the second portion 104-2 of the first arm 104 is making an acute angle with the first curved portion 104-1, and with a gap therebetween such that there is no requirement of any material between the first portion 104-1 and the second portion 104-2, unlike the existing levers where the arm on one side of the guiding path is continuous. Thus, the material required for manufacturing the proposed first lever 100 as well as its weight and area covered is lesser compared to the lever of existing technologies.

Therefore, the present disclosure provides a simple, cost-effective, efficient, and first lever 100 for smooth functioning of an air vent assembly 200, which maintains constant and smooth contact/abutment with the movable disc 208 of the air vent assembly 200 despite the dimension variability/tolerance of the movable disc 208 and the first lever and also enables smooth stopping of the first lever 100 onto the inner surface of the housing of the air vent assembly 200.

Figure 2:
FIG. 2 illustrates an exemplary cross-sectional view of the proposed air vent assembly having the first lever of FIG. 1.

Referring to FIG. 2, in another aspect, the proposed air vent assembly 200 can include one or more flaps 204-1 and 204-2 (collectively referred to as flap 204, herein) to at least partially restrict airflow into an interior of the vehicle, and vane(s) 206 to control air directivity into the vehicle interior. The assembly 200 can include an actuation mechanism 212 that can be accessible for a user arranged in the vehicle interior to actuate the movable disc 208 of the assembly 200.

In an embodiment, the assembly 200 can include a first lever 100 connected to the flap 204-1 to control the movement of the flaps 204. The first lever 100 can include a first arm 104, and a second arm 106, each extending from a base portion 102 to create a first guiding path 108 between the first arm 104 and the second arm 106. Further, the first lever 100 can include a flexible third arm 110, made of flexible material or having a reduced or smaller thickness compared to a cross-sectional thickness of the first lever 100 and extending from the base portion 102, which can be configured substantially parallel to the second arm 106 on one side of the second arm 106 (opposite to the first arm 104). A first end of the flexible third arm 110 can be connected to the base portion 102, and a second end of the flexible third arm 110 can be a free end that can allow the flexible third arm 110 to move with respect to the second arm 106 upon application of a force on the flexible third arm 110.

In an embodiment, the assembly 200 can include a second lever 202 configured with a second guiding path 108'. The vanes 206 can be connected to the second lever 202 to control the movement of the vanes 206, thereby controlling or adjusting air directivity into the vehicle interior. The vanes 206 can be configured with the second guiding path 108' between two arms of the second lever 202.

In an embodiment, the first lever 100 and the second lever 202 can be made of a material selected from Acrylonitrile butadiene styrene (ABS)+Polycarbonate (PC) or Polyoxymethylene (POM), or can be of a known metal material. In another embodiment, the third flexible arm 110 of the lever 100 can be made of Polypropylene (PP) or Thermoplastic Elastomer (TPE).

In an embodiment, the assembly 200 can include a movable disc 208 configured with a guiding pin 214 or 216. The movable disc 208 can be operatively coupled to an actuation mechanism 212 such that upon actuation of the movable disc 208, the guiding pin 214 can engage with and move within the second guiding path (108') of the second lever 202 to rotate the vanes 207 to change the direction of airflow into the vehicle interior. Upon further actuation of the movable disc 208, the guiding pin 214 of the movable disc 208 can disengage with the second lever 202, and the same pin 214 or another guiding pin 216 of the movable disc 208 can engage with and move within the first guiding path 108 of the first lever 100 to rotate the flaps 204 to at least partially restrict the inflow of air into the vehicle interior.

In an embodiment, the first arm 104 of the first lever 100 can have a first portion 104-1 having a curved profile based on an outer curved surface of the movable disc 208 to facilitate abutment of the first portion 104-1 of the first lever 100 with an outer surface of the movable disc 208.

During rotation of the first lever 100 by the actuation mechanism 212, the construction and/or material of the flexible third arm 110 of the first lever 100 can provide a natural biasing effect or elastic effect to an entire length of the flexible third arm 110, which can facilitate smooth and constant abutment of the first portion 104-1 of the first arm 104 with an outer surface of the movable disc 208 and can also facilitate smooth stopping of the first lever 100 or ensuring a soft contact of the first lever 100 against the inner surface of the air vent assembly 200, when a force is applied on the first lever 100 by the movable disc 208 upon actuation of the movable disc 208, especially during end stroke of the movable disc 208 or first lever 100.

Figures 3A, 3B:
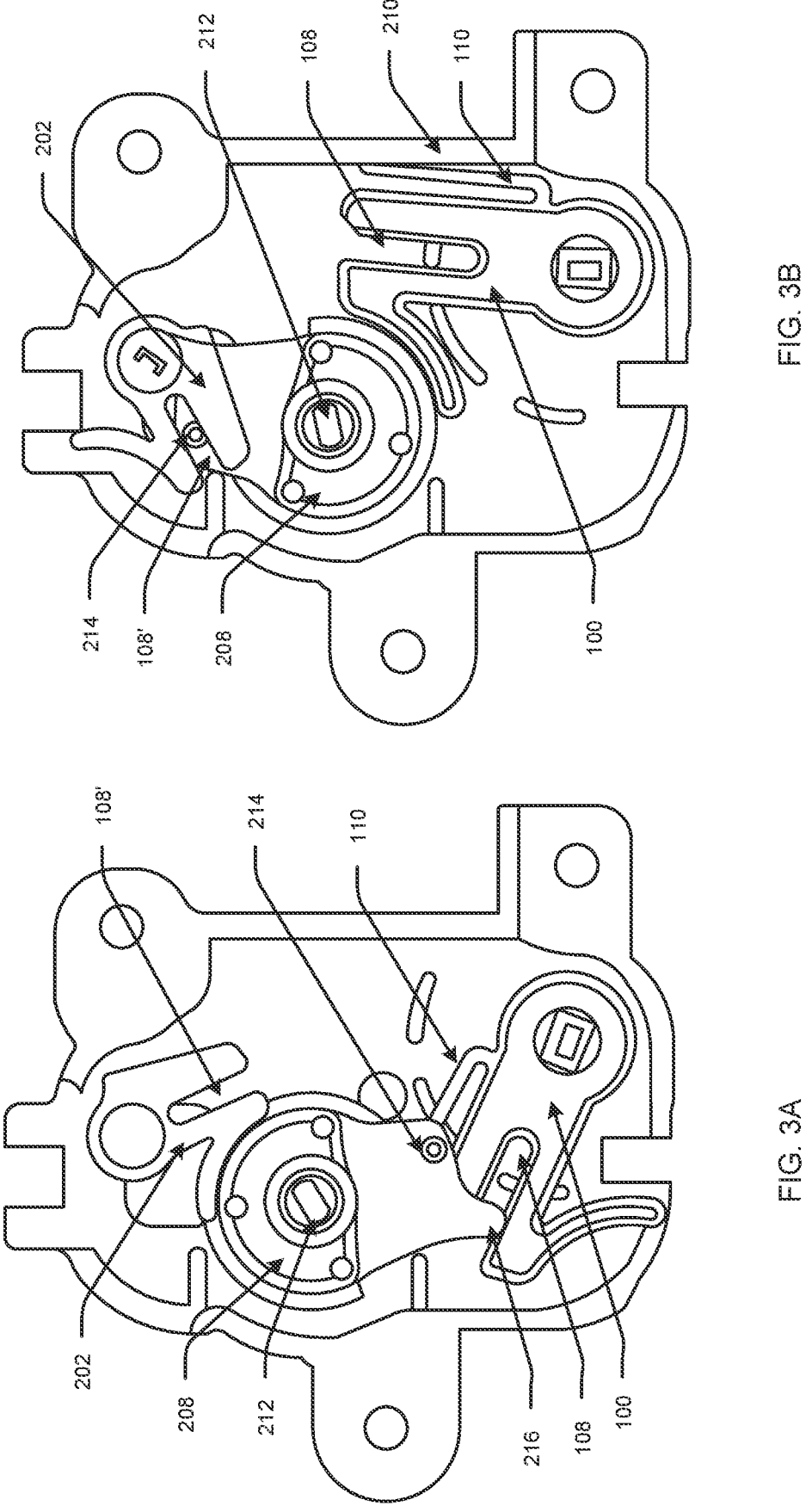
FIG. 3A to 3C illustrate actuation of the movable disc by an actuating mechanism to enable movement of the first lever, and/or the second lever in the proposed air vent assembly, ensuring smooth and contact abutment between the first lever and the movable disc, in accordance with an embodiment of the present disclosure.
Figures 4A, 4B:
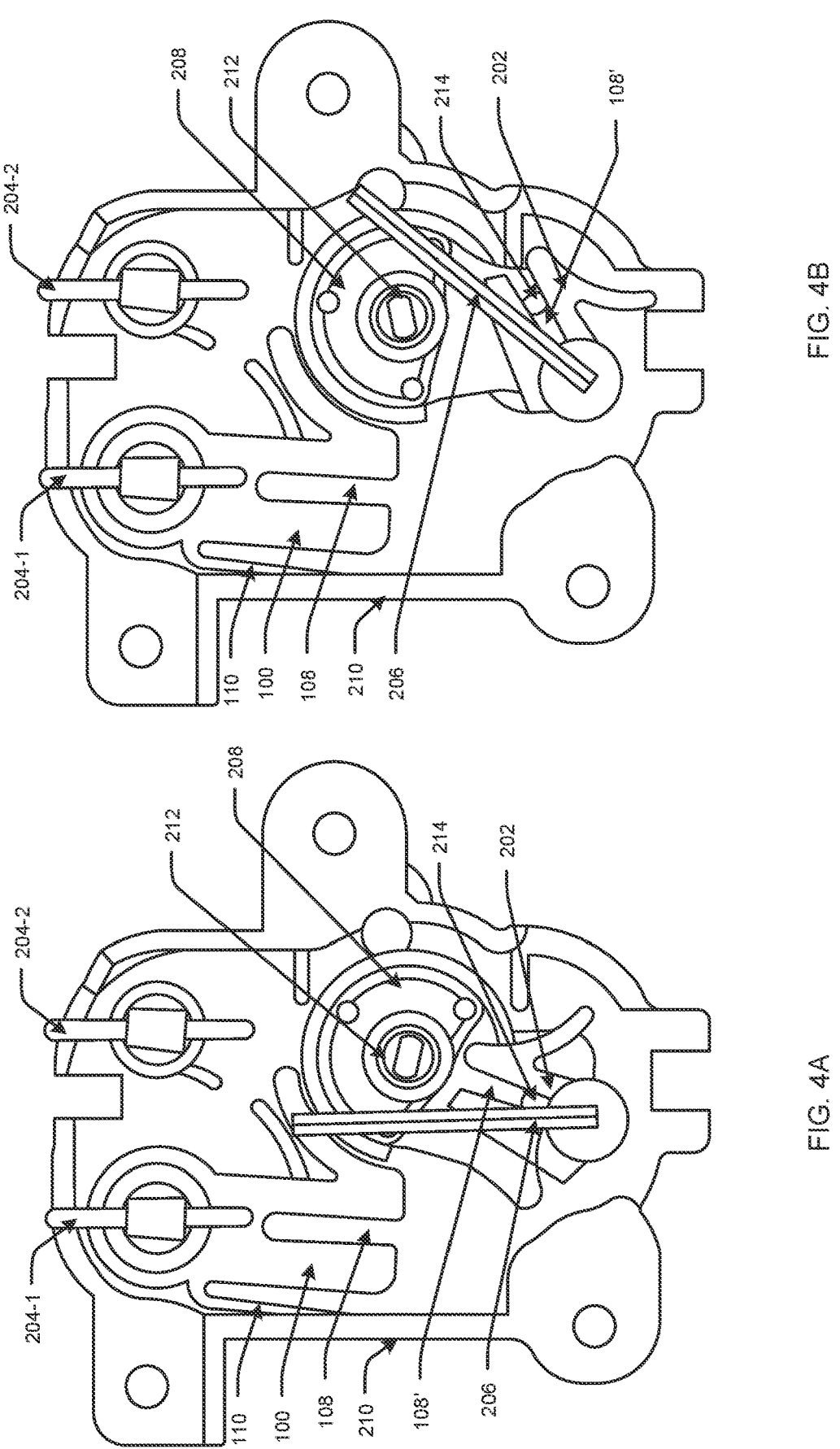
FIG. 4A to 4E illustrates different positions of the flaps and the vanes during the control of airflow directivity, and/or restricting the inflow of air into the vehicle interior by the proposed air vent assembly, in accordance with an embodiment of the present disclosure.
Figures 4C, 4D:
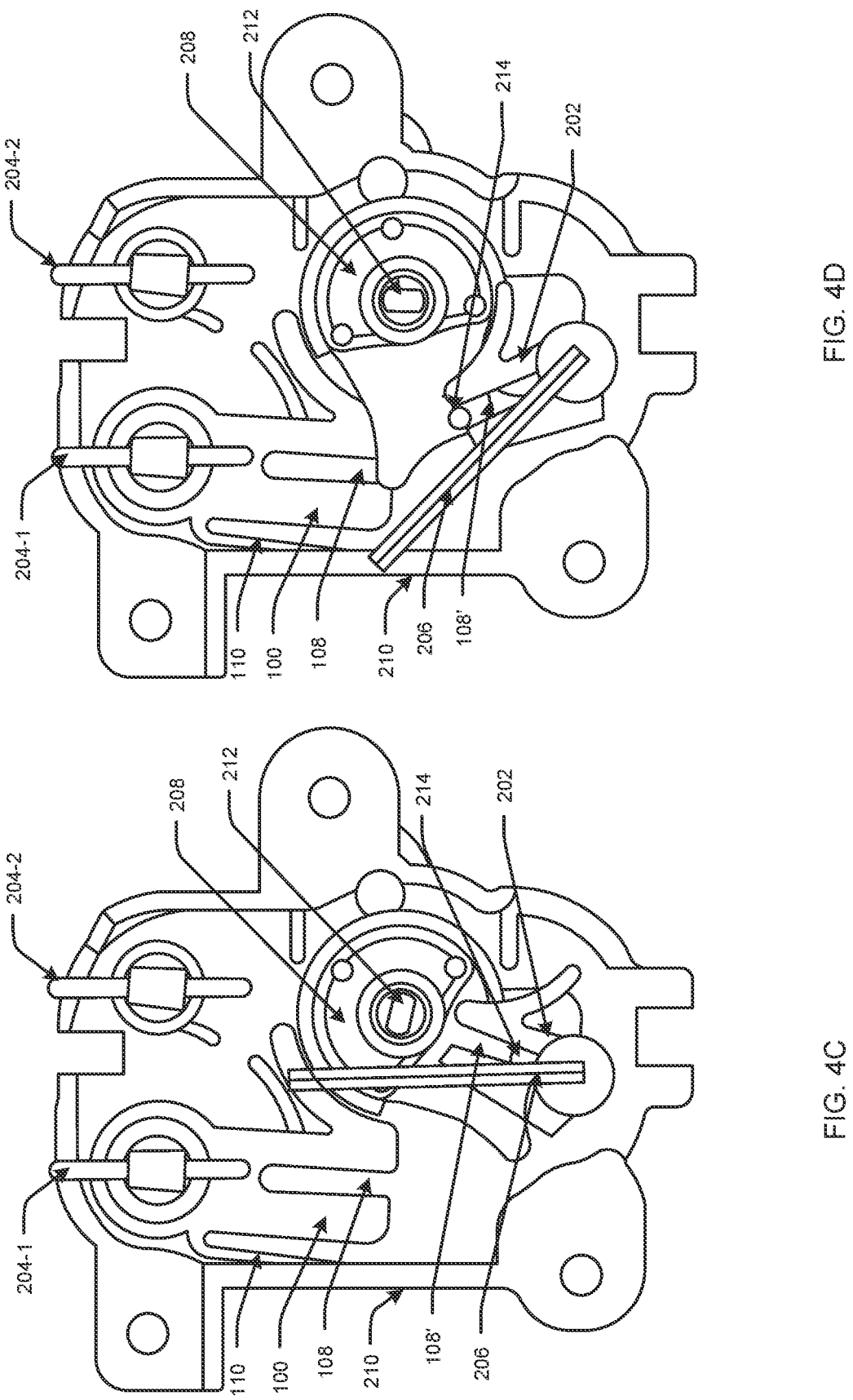
Figure 4E:
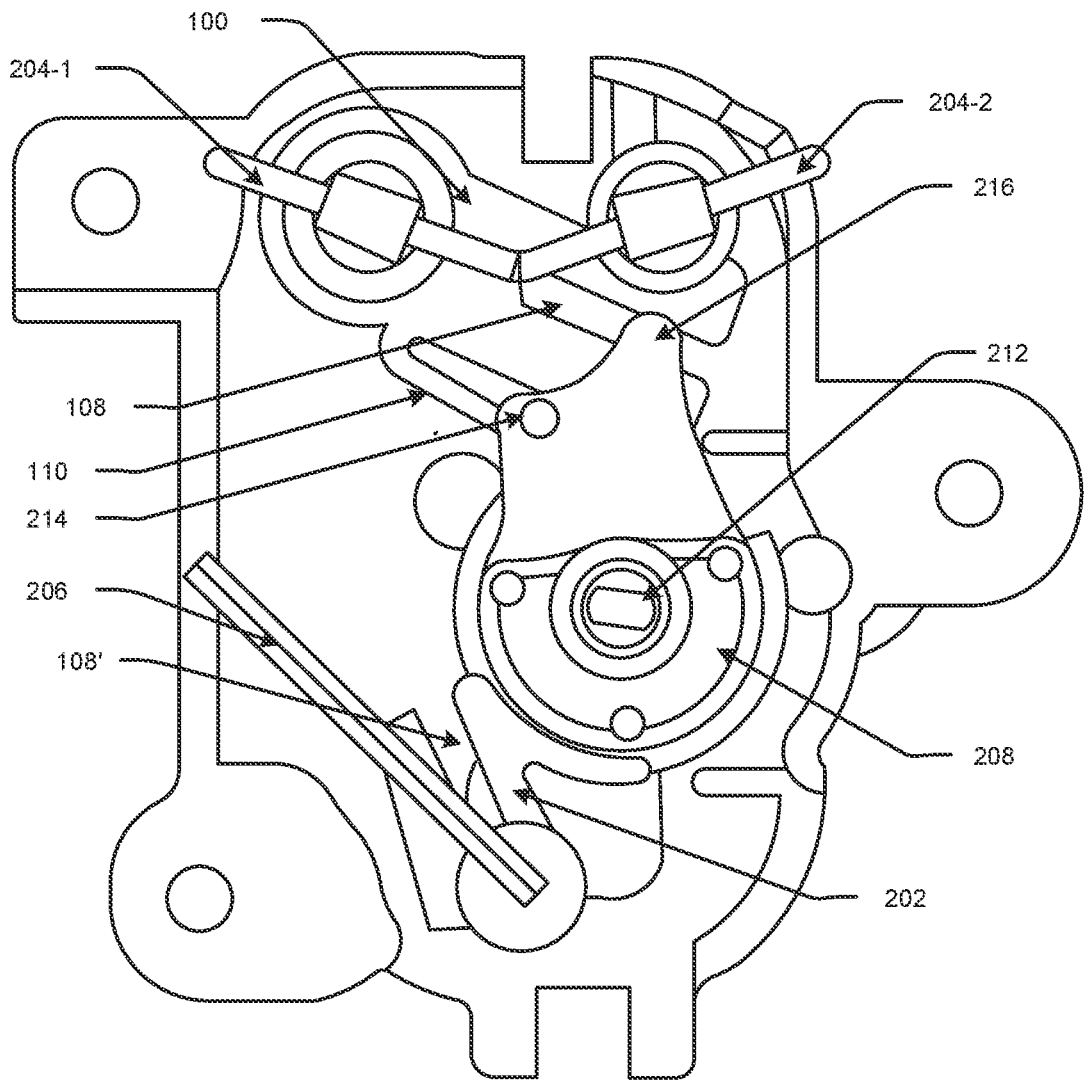

In an embodiment, the first lever 100 can move the flaps 204 between a shutoff position as shown in FIGS. 3A and 4E, and an open position as shown in FIG. 3B. In the shutoff position, as shown in FIGS. 3A and 4E, the engagement of the guiding pin 216 of the movable disc 208 (upon rotation of the movable disc 208 in a clockwise direction) with the first guiding path 108 can move the first lever 100 in an anti-clockwise direction, which correspondingly moves the flaps 204 to at least partially restrict the inflow of air into the vehicle interior.

Figure 3C:
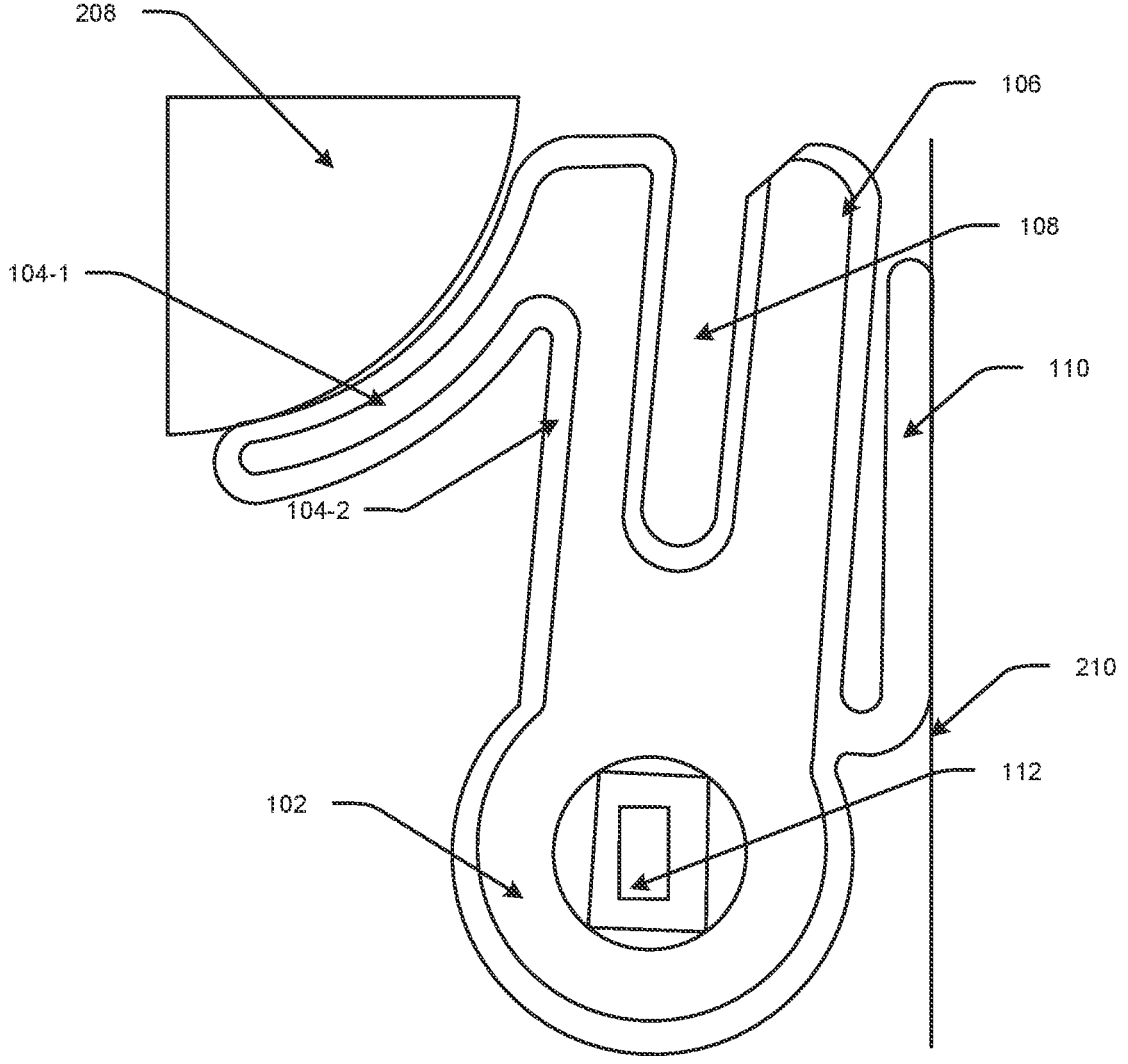

In the open position, as shown in FIGS. 3B and 3C, the first lever 100 can move in the clockwise direction such that the flexible third arm 110 of the first lever 100 rests on an inner surface of the housing 210, and the guiding pin 216 or 214 remains disengaged with the first guiding path 108. However, the first portion 104-1 of the first lever 100 remains in contact and smooth abutment with the outer surface of the movable disc 208. Further, the guiding pin 214 remains engaged with the second lever 202 during the open position, which can correspondingly allow movement of the vane 206 in a required direction to control air directivity into the vehicle interior as shown in FIGS. 4A to 4D.

FIG. 4A illustrates an exemplary cross-sectional view of the assembly 200 having an operating member of the actuation mechanism 212, the vane 206, and the flaps 204 at 0 degrees (initial position), which allows air to flow straight inside the vehicle interior.

FIG. 4B illustrates an exemplary cross-sectional view of the assembly 200 when the operating member 212 is moved from 0 degrees (initial position) to −25.5 degrees, which correspondingly moves the vane 206 by −40 degrees, thereby changing the air directivity leftwards. However, the flaps 204 remain at 0 degrees in the open position.

FIG. 4C illustrates an exemplary cross-sectional view of the assembly 200 when the operating member (also designated as 212, herein) is moved back to 0 degrees (initial position) from −25.5 degrees (position in FIG. 4B), which correspondingly moves the vane 206 back to 0 degrees (initial position), thereby allowing air to flow straight inside the vehicle interior. Again, the flaps 204 remain at 0 degrees in the open position.

FIG. 4D illustrates an exemplary cross-sectional view of the assembly 200 when the operating member 212 is moved from 0 degrees (initial position) to 45 degrees, which correspondingly moves the vane 206 by 45 degrees, thereby changing the air directivity rightwards. Again, the flaps 204 remain at 0 degrees in the open position.

FIG. 4E illustrates an exemplary cross-sectional view of the assembly 200 when the operating member 212 is further moved from 40 degrees to 137.5 degrees, which correspondingly moves the vane 206 by 45 degrees. However, the flaps 204 also move by 70 degrees towards each other, bringing the assembly 200 in the shutoff position and restricting the inflow of air into the vehicle interior.

In an embodiment, the assembly 200 can include a first flap 204-1 and a second flap 204-2 (collectively designated as 204, herein) movably coupled to each other such that movement of the first flap 204-1 can move the second flap 204-2. Further, the first lever 100 can be connected to the first flap 204-1 only such that rotation of the first flap 204-1 by the first lever 100 can correspondingly move the second flap 204-2, thereby restricting the inflow of air into the vehicle interior at least partially or completely. In another embodiment, the flaps 204-1 and 204-2 can rotate opposite to each other to configure the shut-off position as shown in FIG. 4E. For instance, as inferred from FIGS. 4D and 4E, when the first flap 204-1 associated with the first lever 100 can rotate in a clockwise direction, the second flap 204-2 can rotate anticlockwise to configure the shut-off position and vice versa. In the shut-off position, flaps 204 can prevent airflow into the vehicle interior.

In an exemplary embodiment, an edge portion of the first flap 204-1 and an edge portion of the second flap 204-2 can be configured with a first flap gear/cam and a second flap gear/cam respectively. The flap gears/cams can be connected for rotating the first flap 204-1 and the second flap 204-2 in opposite directions to at least partially prevent the airflow and also to configure a shut-off position to completely prevent the airflow into the vehicle interior In an embodiment, the actuating mechanism 212 of the movable disc 208 can include the operating member which can be a motor coupled with a gear drive. In another embodiment, actuating mechanism 212 can be a manually operated thumbwheel coupled to a gear drive for operating the air vent assembly 200 manually. A portion of the movable disc 208 can be accessible to a user to actuate the movement of the vane 206 or flaps 204 manually.

In an exemplary embodiment (not shown), the actuating mechanism 212 can include a spur gear drive having a first gear configured with the operating member, and a second gear configured with the movable disc 208 such that actuation of the operating member 212 enables rotation of the movable disc 208 to move the flaps or the vanes in a required direction.

In an embodiment, the first lever 100 can be connected and mounted on a top portion of the flap 204, and the second lever 202 can be connected and mounted on a top portion of the vane 206. Both the first lever 100 and the second lever 202 can have an engaging portion, which can accommodate and lock the flap 204, and the vane 206. Specifically, the first lever 100 can have a first male portion which can be releasably lockable with a first female portion of the flap 204 at point 122 on the base portion. Further, the second lever 202 can have a second male portion, which can be releasably lockable with a second slot of the vane 206.

In an embodiment, the guiding pins 214 or 216 of the movable disc 208 can be small protrusions, which extend vertically downward or upward from the movable disc 208 to engage with the guiding paths of the first lever 100 and/or the second lever 202.

In an embodiment, the free ends of the first arm 104, and the second arm 106 of the first lever 100 can have a predefined profile, which can facilitate the guiding pin 214 or 216 to move within or move out of the first guiding path 108 of the first lever 100. Similarly, the free ends of the arms of the second lever 202 can also have a predefined profile, which can facilitate the guiding pin 214 or 216 to move within or move out of the second guiding path 108' of the second lever 202.

In an implementation, when the air vent is configured vertically with an HVAC duct of the vehicle, actuation of the movable disc 208 in an anti-clockwise or clockwise direction (by rotating the operating member) can enable rotation of the vane 206 in the clockwise or anti-clockwise direction, respectively, which can correspondingly enable the deflection of the air in a leftward or rightward direction, as shown in FIGS. 4A to 4D, respectively. Similarly, when the air vent assembly 200 is configured horizontally with the HVAC duct, the vane 206 can deflect the air in an upward or downward direction.

Therefore, the present disclosure provides an air vent assembly for vehicle interior for controlling the individual movement of airflow restricting flaps, and air directivity controlling vanes with a single actuating mechanism, and which is simple, compact, and robust in design, and can reduce the complexity in assembling the air vent.

Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

The proposed invention provides a lever with a flexible arm for smooth functioning of an air vent assembly.

The proposed invention provides a lever for an air vent assembly, which maintains constant and smooth contact/abutment with the movable disc of the air vent assembly despite the dimension variability/tolerance of the movable disc and the lever due to the material of the both.

The proposed invention provides a lever for an air vent assembly, which is compact and requires less material and effort for manufacturing and facilitates proper functioning to the air vent assembly.

The proposed invention provides an air vent assembly for vehicle interior, which can control the individual movement of airflow restricting flaps, and air directivity controlling vanes with a single actuator.

The proposed invention provides an air vent assembly for vehicle interior, which is simple, compact, and robust in design, and can reduce the complexity in assembling the air vent.

The proposed invention provides an air vent assembly for vehicle interior having a lever with a flexible arm that maintains constant and smooth contact with a movable disc of the air vent assembly despite the dimension variability/tolerance of the movable disc and the lever due to the material and soon.

The invention claimed is:

1. A lever for an air vent assembly of a vehicle, the lever comprising:
   a base portion;
   a first arm, and a second arm, each extending from the base portion such that a guiding path is created between the first arm and the second arm, the guiding path adapted to engage a guiding pin of a movable disc of the air vent assembly;
   wherein a flexible third arm extending from the base portion is adapted to provide a biasing force or biasing effect and thus facilitate smooth and constant abutment of the first arm with an outer surface of the movable disc,
   wherein a first portion of the first arm comprises a curved profile based on a profile of an outer surface of the movable disc to facilitate abutment of the first portion of the first arm with the movable disc; wherein a second portion of the first arm is a longitudinal member connecting the first portion of the first arm to the base portion.

2. The lever as claimed in claim 1, wherein the first portion of the first arm extends at a predefined acute angle ranging from 30 to 80 degrees from the second portion of the first arm.

3. The lever as claimed in claim 1, wherein the second arm and the second portion of the first arm extend parallel to each other to create the guiding path therebetween.

4. The lever as claimed in claim 1, wherein the lever is adapted to be rotatably coupled to one or more flap that at least partially resists an inflow of air into a vehicle interior of the vehicle or changes an airflow directivity into the vehicle interior.

5. The lever as claimed in claim 4, wherein, upon actuation of the movable disc in a first direction, the guiding pin engages with and moves within the guiding path of the lever to rotate the lever in a second direction opposite to the first direction, and correspondingly moves the one or more flap to at least partially resist the inflow of air into the vehicle interior of the vehicle or to change the airflow directivity into the vehicle interior.

6. The lever as claimed in claim 1, wherein the flexible third arm is configured substantially parallel to the second arm and has an angle of 0-10 degrees with respect to the second arm, which facilitates smooth stopping of the flexible third arm against an inner surface of a housing of the air vent assembly when a force is applied on the lever by the movable disc upon actuation of the movable disc.

7. The lever as claimed in claim 1, wherein the flexible third arm is made of a material selected from PP or TPE thus facilitating the flexibility.

8. An air vent assembly for a vehicle, the air vent assembly comprising:

the lever as claimed in claim 1, wherein the lever is a first lever and is connected to one or more flap that at least partially restricts airflow into an interior of the vehicle or changes an airflow directivity into the interior of the vehicle;

a movable disc configured with a guiding pin such that upon actuation of the movable disc in a first direction, the guiding pin engages with and moves within the guiding path of the first lever to rotate the first lever in a second direction opposite to the first direction, and correspondingly moves the one or more flap; and wherein the flexible third arm is adapted to facilitate smooth and constant abutment of the first portion of the first arm with an outer surface of the movable disc, also during the movement of the movable disc.

9. The air vent assembly as claimed in claim 8, further comprising a second lever connected to a vane movable to at least partially restrict airflow into the interior of the vehicle or to change the airflow directivity into the interior of the vehicle; wherein the movable disc is configured with the guiding pin or with a second guiding pin such that, upon actuation of the movable disc in a second direction, the guiding pin or the second guiding pin engages with and moves within a second guiding path of the second lever to rotate the second lever in a first direction opposite to the second direction of actuation of the movable disc, and correspondingly moves the vane to at least partially restrict inflow of air into the interior of the vehicle or to change the airflow directivity into the interior of the vehicle.

10. A lever for an air vent assembly of a vehicle, the lever comprising:

a base portion;

a first arm, and a second arm, each extending from the base portion such that a guiding path is created between the first arm and the second arm, the guiding path adapted to engage a guiding pin of a movable disc of the air vent assembly; and a flexible third arm extending from the base portion and adapted to provide a biasing force or biasing effect and thus facilitate smooth and constant abutment of the first arm with an outer surface of the movable disc, wherein the flexible third arm has a smaller cross-sectional thickness compared to a cross-sectional thickness of the lever.

11. The lever as claimed in claim 10, wherein the flexible third arm is at an angle of 0-10 degrees with respect to the second arm.

* * * * *